(12) United States Patent
Nicholas et al.

(10) Patent No.: US 8,371,916 B2
(45) Date of Patent: Feb. 12, 2013

(54) METHOD AND SYSTEM FOR OPERATING AND PARTICIPATING IN FANTASY LEAGUES

(76) Inventors: Frank C. Nicholas, Glenview, IL (US); Ian B. Carswell, Chicago, IL (US)

( * ) Notice: Subject to any disclaimer, the term of this patent is extended or adjusted under 35 U.S.C. 154(b) by 0 days.

(21) Appl. No.: 13/540,567

(22) Filed: Jul. 2, 2012

(65) Prior Publication Data

US 2012/0270619 A1 Oct. 25, 2012

Related U.S. Application Data

(63) Continuation of application No. 12/843,599, filed on Jul. 26, 2010, now Pat. No. 8,210,918, which is a continuation of application No. 11/353,920, filed on Feb. 13, 2006, now Pat. No. 7,762,878.

(60) Provisional application No. 60/652,283, filed on Feb. 11, 2005, provisional application No. 60/710,030, filed on Aug. 18, 2005.

(51) Int. Cl.
*A63F 13/00* (2006.01)

(52) U.S. Cl. .................... 463/9; 463/4; 463/42

(58) Field of Classification Search .................. 463/4, 9, 463/42

See application file for complete search history.

(56) References Cited

U.S. PATENT DOCUMENTS

| 4,918,603 | A  | * | 4/1990 | Hughes et al. | .................... | 463/4 |
| 5,860,862 | A  | * | 1/1999 | Junkin | ............................ | 463/40 |
| 6,371,855 | B1 | * | 4/2002 | Gavriloff | ........................ | 463/42 |
| 8,099,182 | B1 | * | 1/2012 | Kasten | ............................ | 700/91 |
| 2003/0054885 | A1 | * | 3/2003 | Pinto et al. | ..................... | 463/42 |
| 2008/0026804 | A1 | * | 1/2008 | Baray et al. | ...................... | 463/9 |

* cited by examiner

*Primary Examiner* — James S McClellan
(74) *Attorney, Agent, or Firm* — Cardinal Law Group

(57) ABSTRACT

A computer-implemented method for operating a league using at least one fantasy server system includes the following. Fantasy player information including performance history of one or more real-world athletes selected as fantasy players is provided. The fantasy player information is updated in real-time based on fantasy player performance information from a real-world performance. At least one substitution factor is provided. A real-time injury information is received. A real-time fantasy player substitution is determined based on the real-time injury report and the at least one substitution factor.

20 Claims, 13 Drawing Sheets

METHOD AND SYSTEM FOR OPERATING AND PARTICIPATING IN FANTASY LEAGUES

RELATED APPLICATION DATA

This application is a continuation of U.S. application Ser. No. 12/843,599, filed on Jul. 26, 2010 now U.S. Pat. No. 8,210,918, which is a continuation of U.S. application Ser. No. 11/353,920, filed on Feb. 13, 2006 now U.S. Pat. No. 7,762,878, which claims the benefit of U.S. Provisional Application Ser. No. 60/652,283 filed on Feb. 11, 2005, PCT Serial No. PCT/US2005/027659 filed Aug. 4, 2005, and U.S. Provisional Application Ser. No. 60/710,030 filed Aug. 18, 2005. The entirety of each application is hereby incorporated by reference.

FIELD OF THE INVENTION

The present invention generally relates to any type of fantasy league (e.g., sports fantasy leagues). The present invention specifically relates to operating various aspects of a fantasy league in view of facilitating sponsorship of each fantasy player on an individual basis and/or a team basis, and in view of facilitating a transmission of feed formatted content and subfeed formatted content between fantasy systems.

BACKGROUND OF THE INVENTION

A fantasy league is primarily operated by a fantasy server system based on a particular format for facilitating player/team management by one or more fantasy client devices in view of a statistical scoring system for determining a winner among members of a fantasy league supported by the fantasy client devices. For example, a football fantasy server system will provide access by fantasy client devices to a fantasy website for facilitating, among other things, player drafts, player trading, waiver wires, free agent acquisitions and starting lineup selections in view of a statistical scoring system that is based on each football player's weekly performance as a function of the football player's position.

A fantasy league is secondarily operated by the fantasy server system based on a particular format for providing access to fantasy player information by the fantasy client devices that enhances player/team management by each member of the fantasy league supported by the fantasy client devices. For example, a football fantasy server system currently provides access by fantasy client devices to a fantasy website managing fantasy player information in the form of reports, articles, commentaries, statistics and the like that is related, directly and indirectly, to past, present and future performances of football players whereby the information is intended to serve as a guide for player/team management by each member of the fantasy football league supported by the fantasy client devices.

Over the years since the earliest creation of fantasy server systems, efforts by designers of the fantasy server systems to realize comprehensive sponsorship of fantasy players has been meet with limited success. The present invention significantly advances that state-of-art in sponsored fantasy server operation and fantasy client participation in fantasy leagues.

Furthermore, a transmission of fantasy player information of a fantasy player from a fantasy server system to a fantasy client device has historically involved limited types of information. The present invention also significantly advances the state-of-art in fantasy player information of a fantasy player provided to a fantasy client device.

SUMMARY OF THE INVENTION

One form of the present invention is a fantasy server system for operating a fantasy league. The fantasy server system includes a computer-implemented method for providing fantasy player information regarding performance history of one or more real-world athletes selected as fantasy players, updating the fantasy player information in real-time based on fantasy player performance information from real-world performance, providing at least one substitution factor, receiving a real-time injury report, and determining a real-time fantasy player substitution based on the real-time injury report and the substitution factor. The fantasy server system further includes a computer-implemented method for providing information to a fantasy client including a real-time fantasy player substitution recommendation. The fantasy server system further includes a computer-implemented method for receiving substitution confirmation from the fantasy client, wherein the real-time fantasy player substitution is based on the substitution confirmation. The fantasy server system further includes a computer-implemented method for providing a fantasy player substitution update to a fantasy opponent.

A second form of the present invention is a fantasy server system for operating a fantasy league. The fantasy server system includes a computer-implemented method for providing fantasy player information regarding performance history of one or more real-world athletes selected as fantasy players, updating the fantasy player information in real-time based on fantasy player performance information from real-world performance, providing at least one fantasy player associated with a fantasy client, receiving information about the at least one fantasy player, sending a real-time injury alert to the fantasy client, the injury alert relating to the at least one fantasy player, and receiving a real-time fantasy player replacement based on the real-time injury alert. The fantasy server system further includes a computer-implemented method for determining whether the fantasy player replacement is in compliance with a fantasy league transaction policy. The fantasy server system further includes a computer-implemented method for sending a confirmation or rejection message based on the determination of whether the fantasy player transaction request is in compliance with the fantasy league transaction policy. The fantasy server system further includes a computer-implemented method for sending a real-time index with players available for substitution to the fantasy client. The fantasy server system further includes a computer-implemented method for sending real-time fantasy player performance information regarding players available for substitution.

A third form of the present invention is a fantasy server system for operating a fantasy league. The fantasy server system includes a computer-implemented method for providing fantasy player information regarding performance history of one or more real-world athletes selected as fantasy players, updating the fantasy player information in real-time based on fantasy player performance information from real-world performance, providing at least one substitution factor, receiving a real-time injury report, sending a fantasy player substitution recommendation to a fantasy client based on the substitution factors and the real-time injury report, and receiving a real-time fantasy player replacement input from a fantasy client, wherein real-time fantasy player replacement input is a game-play lineup substitution request designating one fantasy player as a substituted fantasy player and another fantasy player as a replacement fantasy player, wherein the gameplay lineup substitution request occurs during a real-time performance of the substituted fantasy player. The fantasy server system further includes a computer-implemented method for associating a substitution time stamp with the gameplay lineup substitution request, determining fantasy scoring for the substituted fantasy player based on the substitution time stamp of the substituted fantasy player, and determining fantasy scoring for the replacement fantasy player based on the substitution time stamp of the replacement fantasy player.

The aforementioned forms and other forms as well as objects and advantages of the present invention will become further apparent from the following detailed description of various embodiments of the present invention read in conjunction with the accompanying drawings. The detailed description and drawings of the various embodiments of the present invention are merely illustrative of the present invention rather than limiting, the scope of the present invention being defined by the appended claims and equivalents thereof.

DETAILED DESCRIPTION OF THE PRESENT INVENTION

Figure 1:
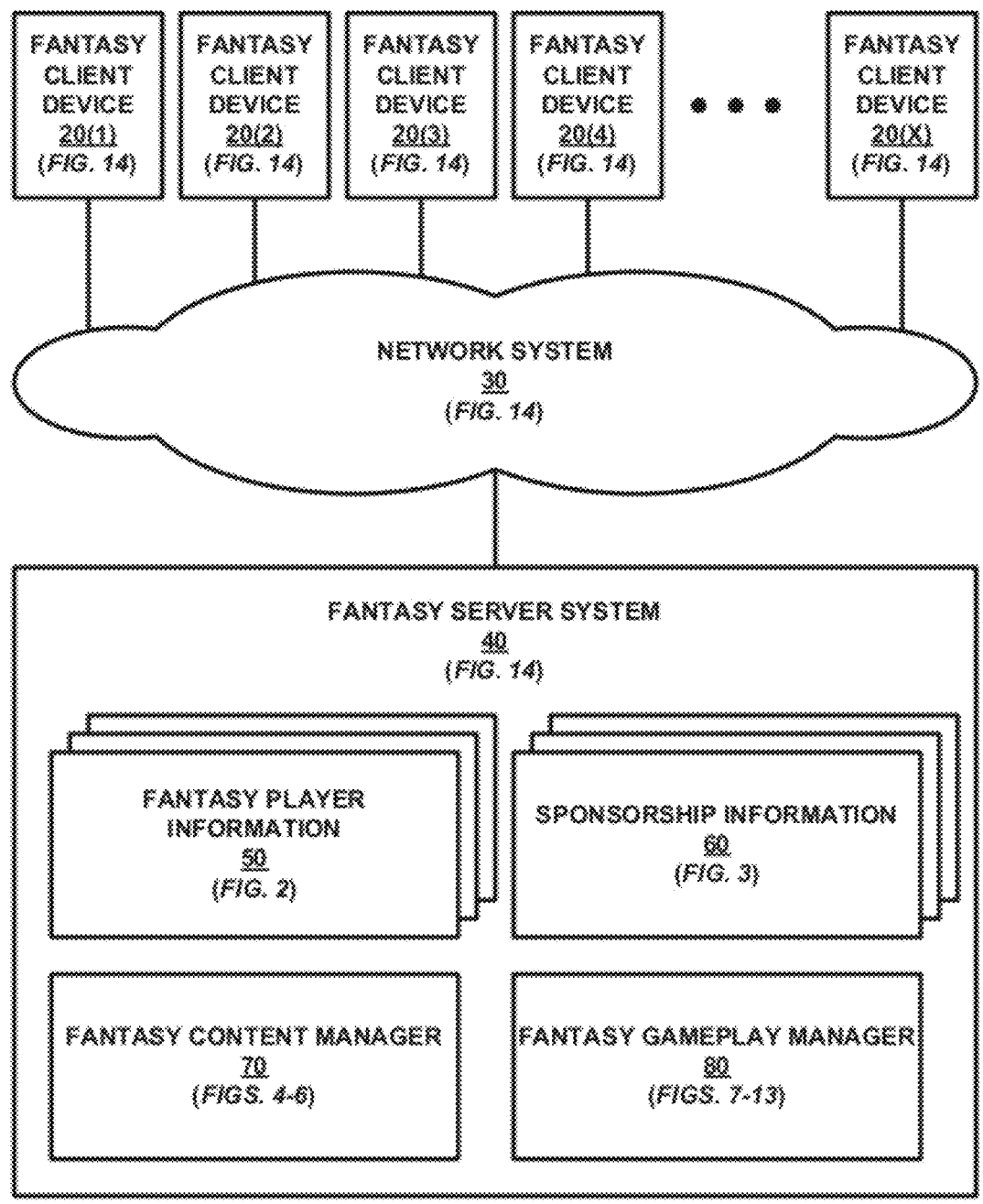
FIG. 1 illustrates an exemplary environment for practicing the present invention.

FIG. 1 illustrates a network based environment employing an X number of fantasy client device 20, where X≧1, a network system 30 and a fantasy server system 40. For purposes of the present invention, the term "fantasy client device" is broadly defined herein as a device of any type structurally configured to facilitate member participation in a fantasy league of any type that is operated by a fantasy server system of the present invention, the term "network system" is broadly defined herein as one network of any type or an interconnect array of networks of any type, and the term "fantasy server system" is broadly defined herein as one or more servers of any type structurally configured to operate the fantasy league.

In operation, network system 30 facilitates bi-directional communication between fantasy client devices 20 and fantasy server system 40 involving access by fantasy client devices 20 to the fantasy league operated by fantasy server system 40. One operational aspect of the fantasy league as provided by fantasy server system 40 is directed to facilitating access to fantasy content by fantasy client devices 20 and facilitating fantasy game play by fantasy client devices 20 as would be appreciated by those having ordinary skill in the art. Examples of this operational aspect include, but are not limited to, (1) off-season actions by fantasy client devices 20 (e.g., configuring the fantasy league, accessing pre-season rankings of fantasy players and conducting a draft of the fantasy players), (2) in-season, off-time actions by fantasy client devices 20 (e.g., managing a lineup prior to or subsequent to real-time performances by the fantasy players, and accessing reports of past performances by the fantasy players and commentaries on predicted future performances of the fantasy players), and (3) in-season, gameplay actions by fantasy client devices 20 (e.g., managing a lineup during real-time performances by the fantasy players, and accessing reports of real-time performances and real-time playing status of the fantasy players).

A new and unique operational aspect of the fantasy league in accordance with the present invention as provided by fantasy server system 40 is directed to a realization of a comprehensive sponsorship of fantasy players on an individual basis and/or a team basis with an improved exchange of fantasy content between fantasy client devices 20 and fantasy server system 40. To this end, as shown in FIG. 1, fantasy server system 40 manages one or more records of fantasy player information 50 and one or more records of sponsorship information 60, and employs a fantasy content manager 70 and fantasy gameplay manager 80.

Figure 2:
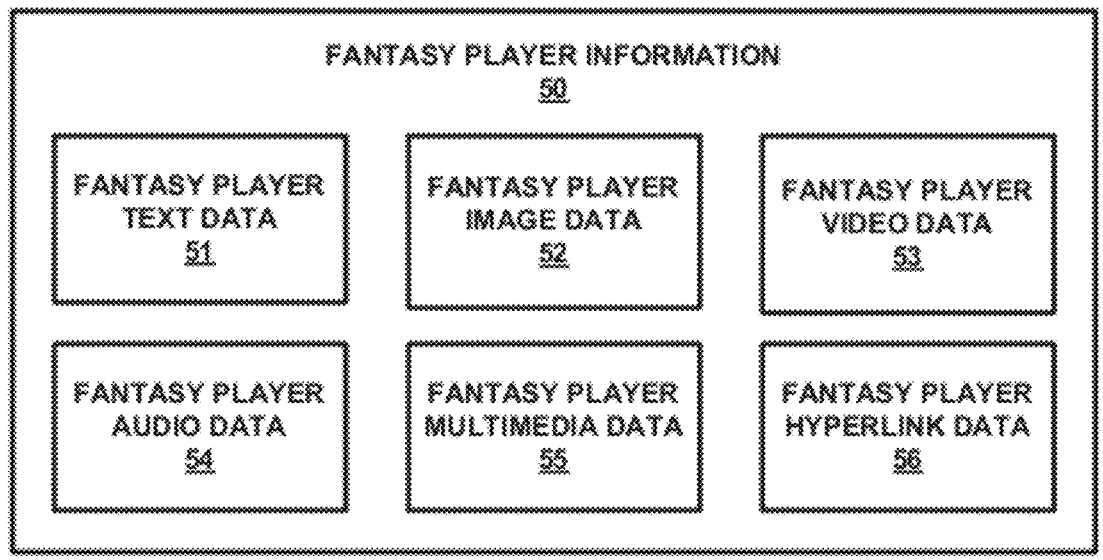
FIG. 2 illustrates one embodiment of fantasy player information in accordance with the present invention.
Figure 3:
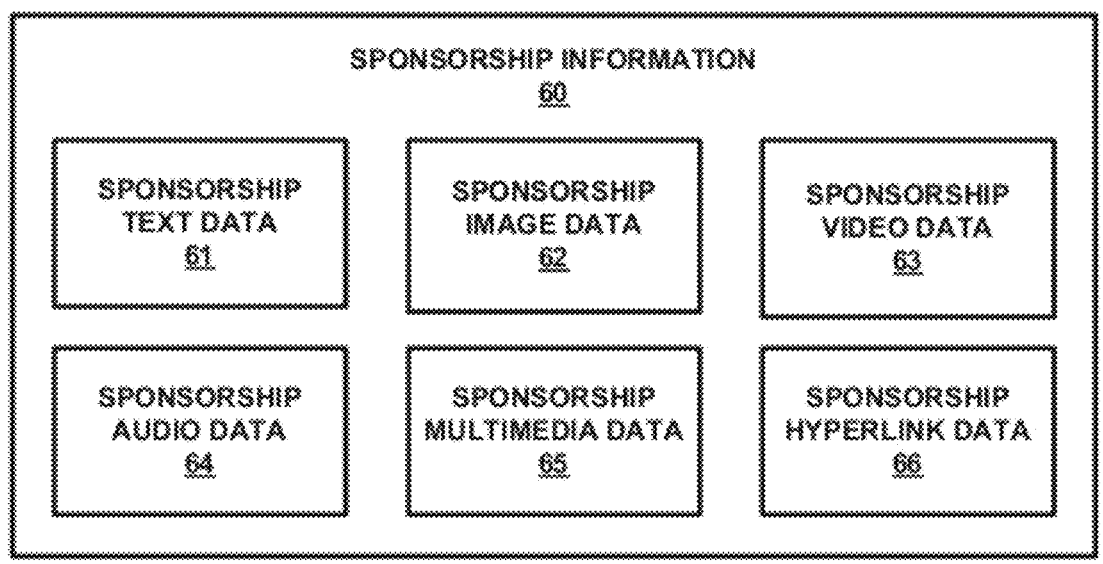
FIG. 3 illustrates one embodiment of sponsorship information in accordance with the present invention.

For purposes of the present invention, the term "fantasy player information" is broadly defined herein as any information of any type that is relevant, directly or indirectly, to a gameplay and performance history of a fantasy player as reviewed by a member of the fantasy league (e.g., physical dimensions, statistics, injury history/status, ranking, recommendations, etc.). In one embodiment, as shown in FIG. 2, fantasy player information 50 is managed by fantasy server system 40 in the form of fantasy player text data 51, fantasy player image data 52, fantasy player video data 53, fantasy player audio data 54, fantasy player multimedia data 55 and fantasy player hyperlink data 56.

For purposes of the present invention, the term "sponsorship information" is broadly defined herein as any information of any type that is relevant to an advertisement/promotion of good(s) and/or service(s) as designated to a fantasy player on an individual basis and/or a team basis, the term "individual basis" is broadly defined herein as a designation by a sponsor of an advertisement/promotion of good(s) and/or service(s) to a specific player (e.g., Indianapolis Star designates the promotion of its paper to Peyton Manning, quarterback of the Indianapolis Colts), and the term "team basis" is broadly defined herein as a designation by a sponsor of an advertisement/promotion of good(s) and/or service(s) to a specific team (e.g., Indianapolis Star designates the promotion of its paper to all of the team members of the Indianapolis Colts). Similarly, in one embodiment, as shown in FIG. 2, sponsorship information 60 is managed by fantasy server system 40 in the form of sponsorship text data 61, sponsorship image data 62, sponsorship video data 63, sponsorship audio data 64, sponsorship multimedia data 65 and sponsorship hyperlink data 66.

In operation, fantasy content manager 70 associates relevant portions of sponsorship information of a fantasy player to relevant portions of fantasy player information of the fantasy player as needed. In particular, fantasy content manager 70 associates relevant portions of sponsorship information of a fantasy player to relevant portions of fantasy player information of the fantasy player in response to fantasy client requests directed to primarily acquiring fantasy player information for purposes of (1) learning/reviewing fantasy player information to thereby make informed gameplay decisions concerning the fantasy player and (2) make recommendations of the fantasy player to another member of the fantasy league. Similarly, fantasy gameplay manager 80 associates relevant portions of sponsorship information of a fantasy player to relevant portions of fantasy player information of the fantasy player in response to fantasy client requests directed to primarily acquiring fantasy player information for purposes of (1) conducting transactions involving a fantasy player prior to and/or during a fantasy performance period of the fantasy player (e.g., drafting, acquiring, releasing, trading, and lineup substitutions) and (2) monitoring a scoring of the fantasy player during a fantasy performance period of the fantasy player.

The following description of FIGS. 4-14 are directed to describing exemplary fantasy client requests scenarios to facilitate an understanding of the present invention by those having ordinary skill in the art.

Figure 4:
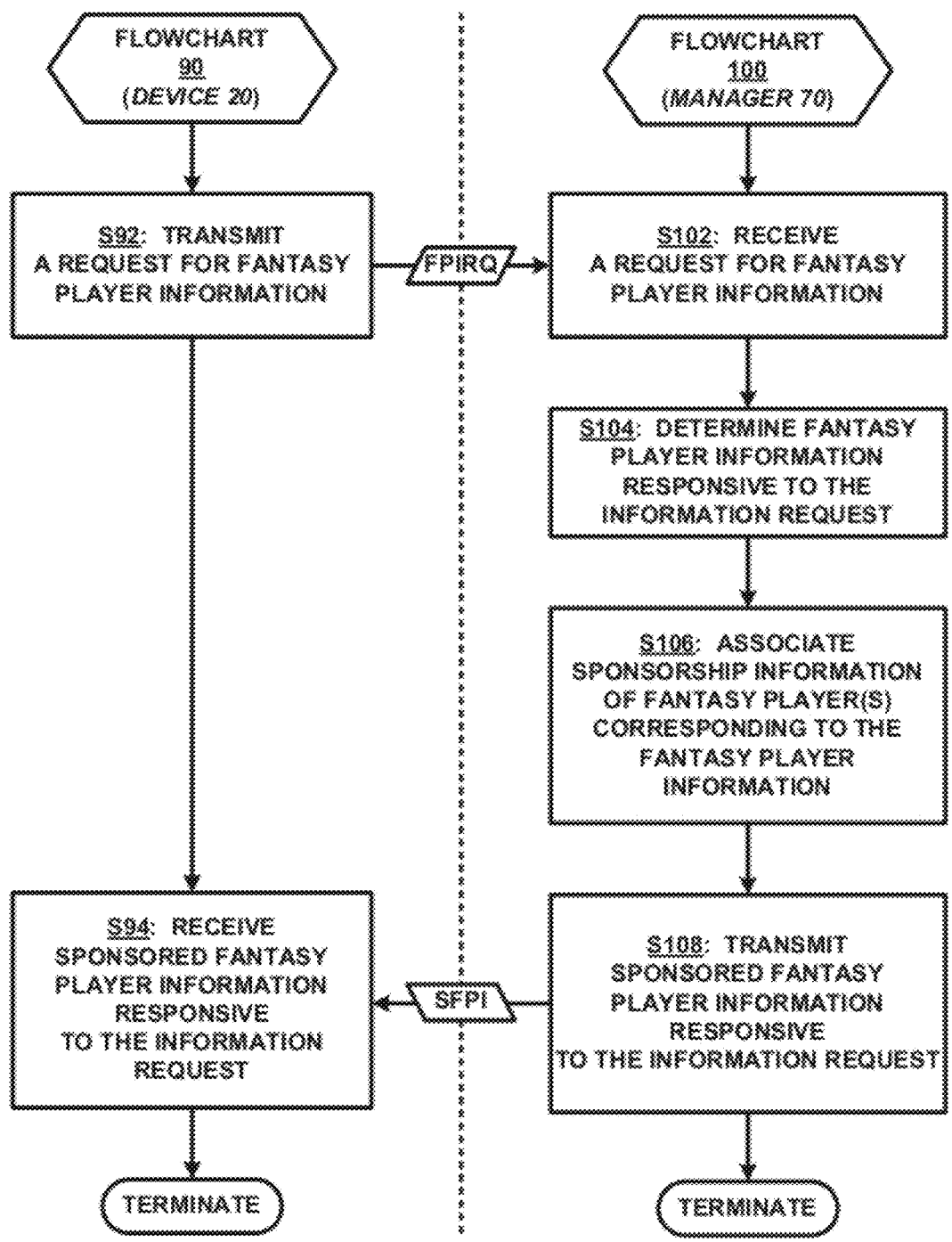
FIG. 4 illustrates a first embodiment of a flowchart representative of a fantasy client request method in accordance with the present invention.

FIG. 4 depicts a fantasy client request in the form of a request for fantasy player information. Specifically, a stage S92 of a flowchart 90 and a stage S102 of a flowchart 100 encompasses one of the fantasy client devices 20 and fantasy content manager 70 exchanging a request for fantasy player information FPIRQ of one or more fantasy players (e.g., a request for player news for Peyton Manning). A stage S104 of flowchart 100 encompasses fantasy content manager 70 determining fantasy player information of fantasy player(s) responsive to the information request (e.g., statistics and news feed items regarding Peyton Manning). A stage S106 of flowchart 100 encompasses fantasy content manager 70 associating sponsorship information of the fantasy players(s) corresponding to the fantasy player information (e.g., associating an advertisement/promotion of Indianapolis star in text, image, audio, video, multimedia, or hyperlink form to Peyton Manning's statistics and news feed items). Finally, a stage S94 of flowchart 90 and a stage S108 of flowchart 100 encompasses the fantasy client device 20 and fantasy content manager 70 exchanging the sponsored fantasy football player information SFPI.

Figure 5:
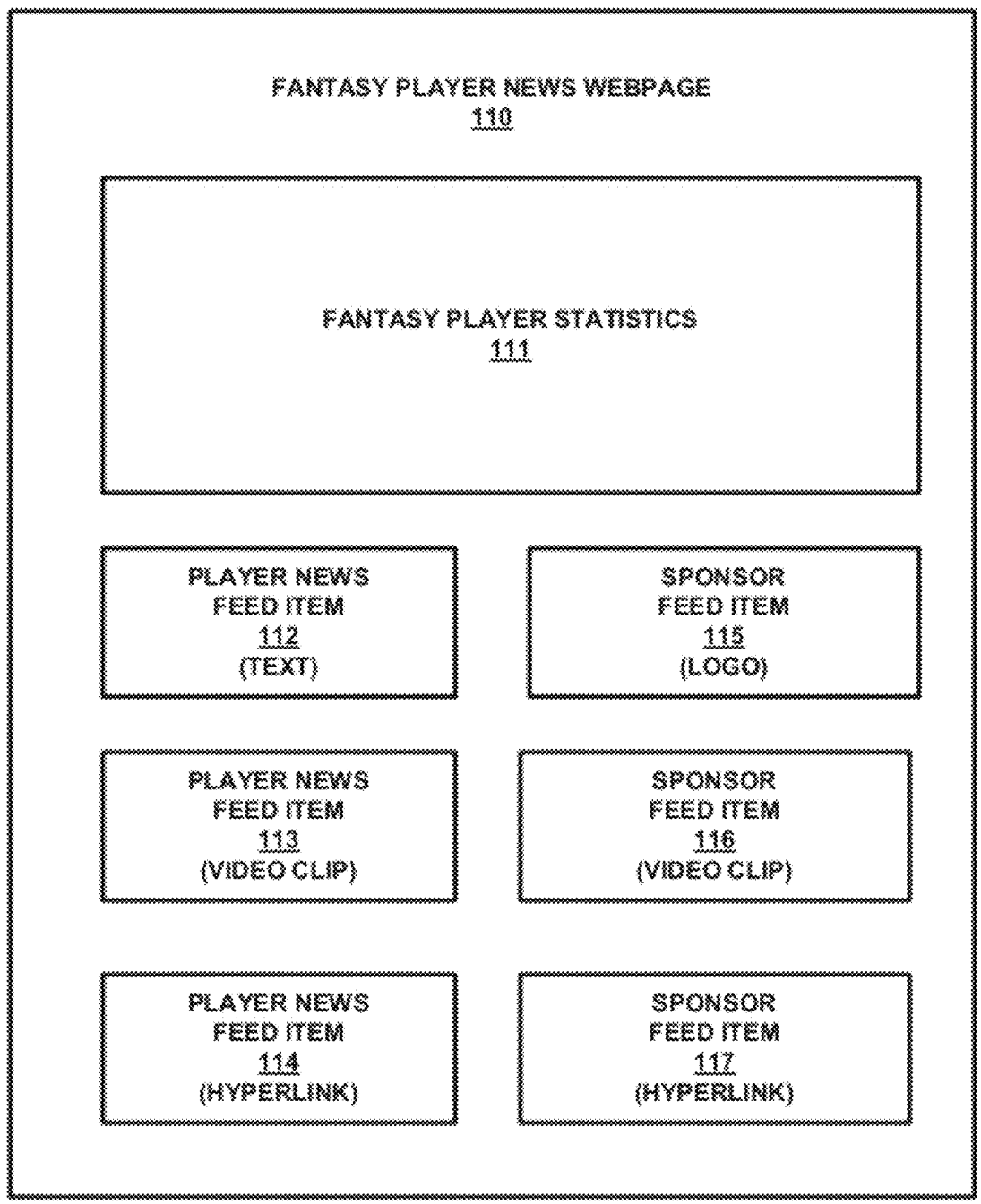
FIG. 5 illustrates a first embodiment of a web page in accordance with the present invention.

The present invention does not impose any limitations or any restrictions to the format of the sponsored fantasy player information. FIG. 5 illustrates an exemplary fantasy player news web page 110 as the form of the sponsored fantasy football player information SFPI provided to the fantasy client device 20. As shown, fantasy player statistics 111 and three (3) player news feed items 112-114 are provided on webpage 110. A sponsor logo feed item 115 is displayed adjacent a player news feed item 112 in text form. A playable sponsor video clip feed item 116 is displayed adjacent player news feed item 113 in video clip form. And a sponsor hyperlink feed item 117 is displayed adjacent players news feed item 114 in hyperlink form.

In view of the applications referenced in paragraph [0001] herein, those having ordinary skill in the art will appreciate feed formatted content is structured data, such as, for example Electronic Data Interchange (EDI), Extensible Markup Language (XML), or a subset of a general format such as RSS (Rich Site Summary or Really Simple Syndication), a hybrid or extension of some such standard, or the like. Feed formatted content may be accessed through a feed, stored in a local file, or the like of fantasy client device 20. The aforementioned feed items are the data corresponding to the feed formatted content of webpage 110. Concurrently or alternatively, subfeed formatted content in the form of a browser window or frame spawned by feed items can also be provided for webpage 110.

In practice, the three sponsor items 115-117 can correspond to the same or difference sponsors. Furthermore, for a subsequent request for the same fantasy player information, new sponsorship information can be associated with the fantasy player information. In one embodiment, this is accomplished by implementing a technique for associating the sponsorship information of fantasy players to the fantasy player information of the fantasy players based on sponsorship selection criteria including, but not limited to, ad-targeting based criteria, profile based criteria, event based criteria and time based criteria as would be appreciated by those having ordinary skill in the art in view of the applications referenced in paragraph [0001] herein.

Figure 6:
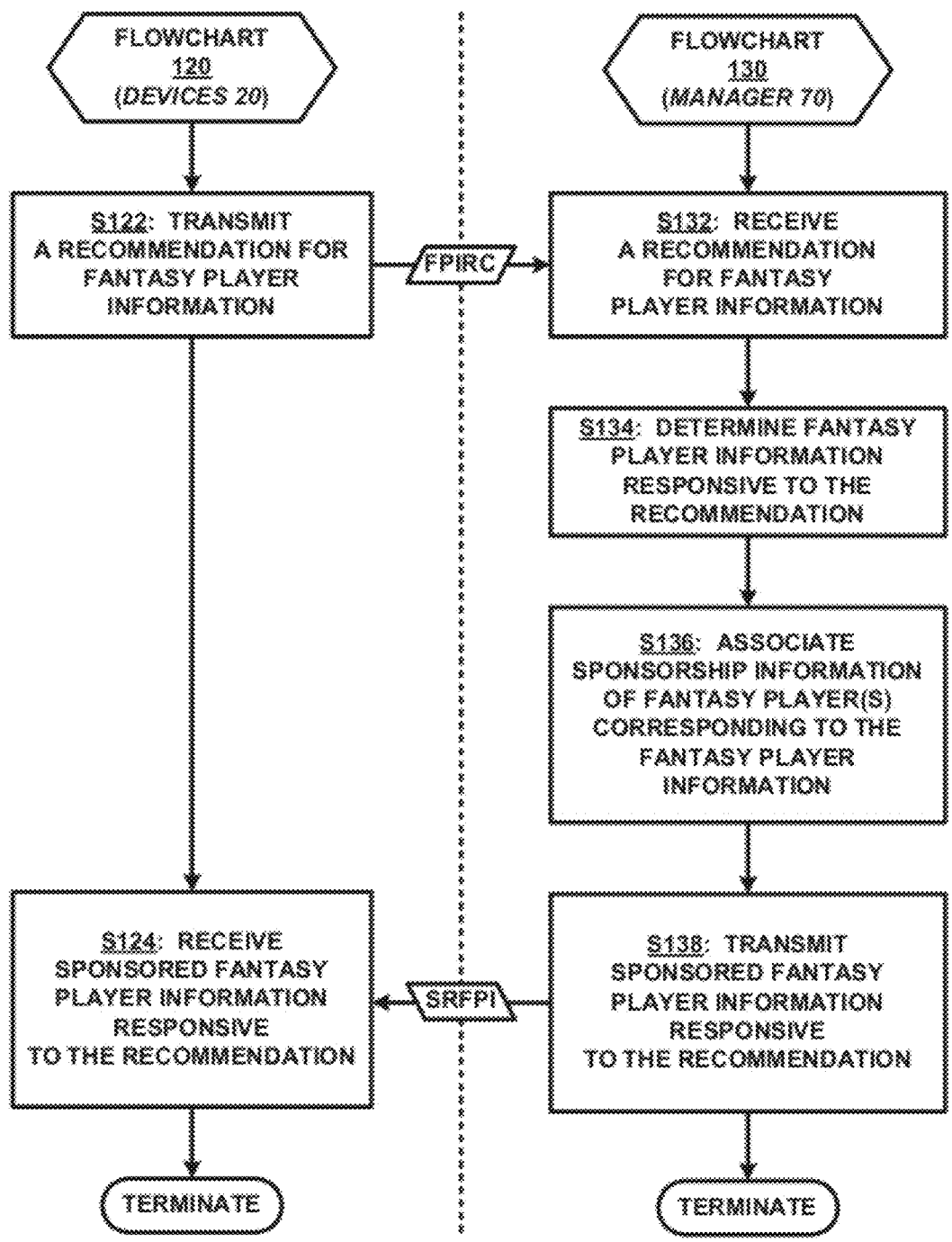
FIG. 6 illustrates a second embodiment of a flowchart representative of a fantasy client request method in accordance with the present invention.

FIG. 6 depicts a fantasy client request in the form of a recommendation of fantasy player information. Specifically, a stage S122 of a flowchart 120 and a stage S132 of a flowchart 130 encompasses one of the fantasy client devices 20 and fantasy content manager 70 exchanging a recommendation for fantasy player information FPIRC of one or more fantasy players (e.g., a recommendation for player news for Peyton Manning) to be transmitted to another one of the fantasy client devices 20). A stage S134 of flowchart 130 encompasses fantasy content manager 70 determining fantasy player information of fantasy player(s) responsive to the information recommendation (e.g., statistics and news feed items regarding Peyton Manning). A stage S136 of flowchart 130 encompasses fantasy content manager 70 associating sponsorship information of the fantasy players(s) corresponding to the fantasy player information (e.g., associating an advertisement/promotion of Indianapolis star in text, image, audio, video, multimedia, or hyperlink form to Peyton Manning's statistics and news feed items). Finally, a stage S124 of flowchart 120 and a stage S138 of flowchart 130 encompasses the intended fantasy client device 20 and fantasy content manager 70 exchanging the sponsored recommended fantasy football player information SRFPI.

A fantasy player recommendation webpage can be similarly structured to fantasy player news web page 110 as shown in FIG. 5.

Figure 7:
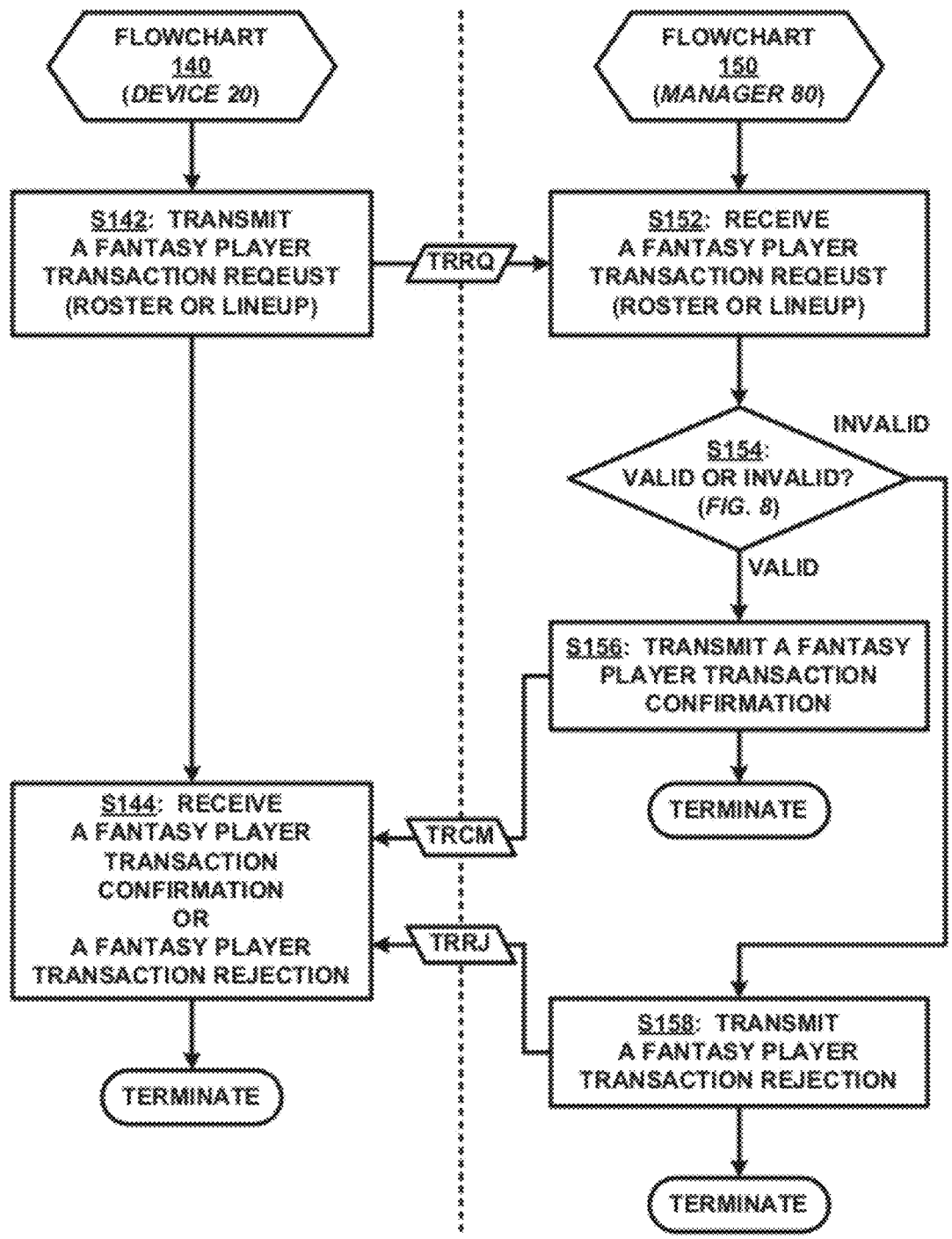
FIG. 7 illustrates a third embodiment of a flowchart representative of a fantasy client request method in accordance with the present invention.
Figure 8:
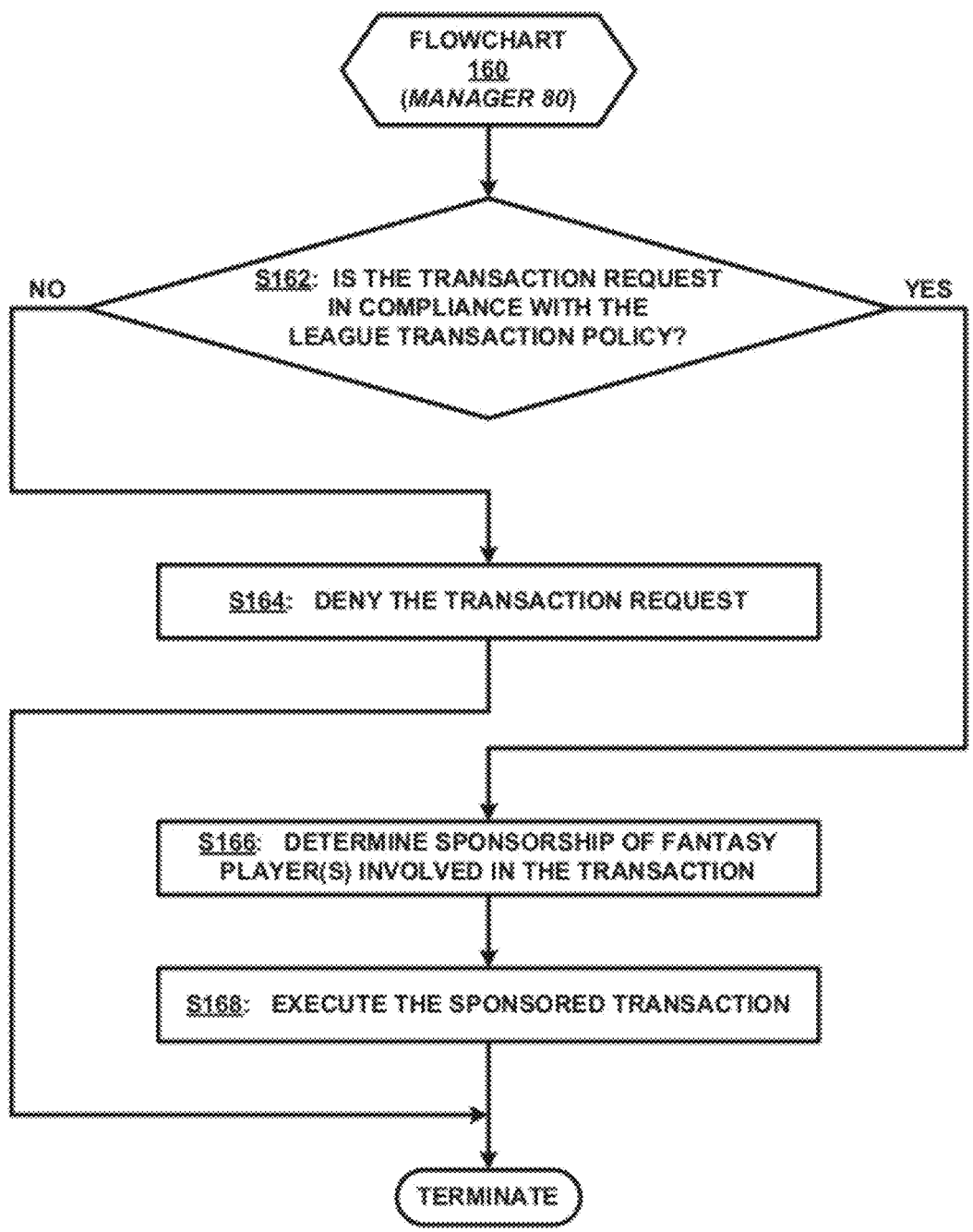
FIG. 8 illustrates one embodiment of a flowchart representative of a transaction validation method in accordance with the present invention.

FIG. 7 depicts a fantasy client request in the form of a fantasy player transaction request. Specifically, a stage S142 of a flowchart 140 and a stage S152 of a flowchart 140 encompasses a fantasy client device 20 and fantasy gameplay manager 80 exchanging a fantasy player transaction request TRRQ involving one or more fantasy players (e.g., a drafting, a waiver addition, a waiver release, a free agent addition, a free agent release and a trade involving one or more fantasy players). A stage S154 of flowchart 150 encompasses fantasy gameplay manager 80 determining whether the fantasy player transaction request is valid or invalid.

In one embodiment, a stage S162 of a flowchart 60 encompasses fantasy gameplay manager 80 determining whether the fantasy player transaction request is in compliance with the fantasy league transaction policy. For example, such a policy may specify one or more transaction time periods and which types of transactions are legal and which types are illegal during each transaction time period (e.g., trading can only occur from Monday to Friday during each week of the fantasy season and a waiver addition can only occur after three days from a fantasy player's waiver release). The fantasy player transaction request is denied during a stage S164 of flowchart 160 if it is determined by fantasy gameplay manager 80 not to be in compliance with the fantasy league transaction policy. Otherwise, fantasy gameplay manager 80 associates relevant portions of sponsorship information of the subject fantasy player(s) to the relevant portions fantasy player information of the subject fantasy player(s) during a stage S166 of flowchart 160, and executes the sponsored transaction during a stage S168 of flowchart 160.

Figure 9:
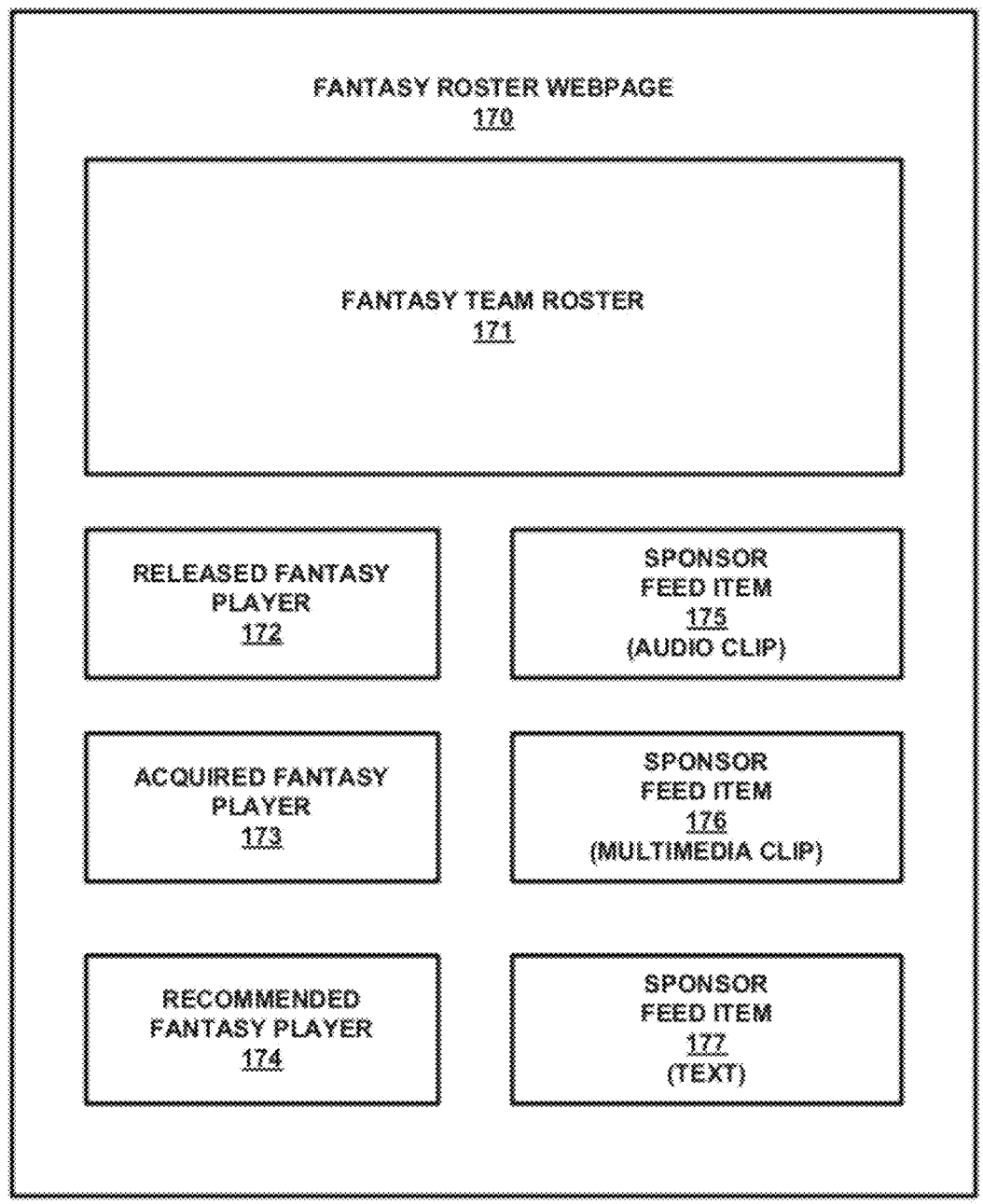
FIG. 9 illustrates a second embodiment of a web page in accordance with the present invention.

In one embodiment, an execution of the sponsored transaction invokes a generation by fantasy gameplay manager 80 of one or more webpages related to the sponsored transaction. FIG. 9 illustrates an exemplary fantasy roster webpage 170 generated in response to a sponsored transaction. As shown, a fantasy team roster 171 is provided on webpage 170. Provided below roster 171, a released fantasy player hyperlink 172 and an associated sponsor audio clip feed item 175 are displayed. Next, an acquired fantasy player hyperlink 173 and an associated sponsor multimedia clip feed item 176 are displayed. Finally, a recommended fantasy player hyperlink 174 and an associated sponsor text feed item 177 are displayed.

Referring again to FIG. 7, a stage S144 of flowchart 140 and a stage S168 of flowchart 160 encompasses the intended fantasy client device 20 and fantasy content manager 70 exchanging a fantasy player transaction confirmation TRCM for an executed sponsored transaction, or alternatively, stage S144 of flowchart 140 and a stage S168 of a flowchart 160 encompasses the intended fantasy client device 20 and fantasy content manager 70 exchanging a fantasy player transaction rejection TRRF for an a denied transaction request.

Figure 10:
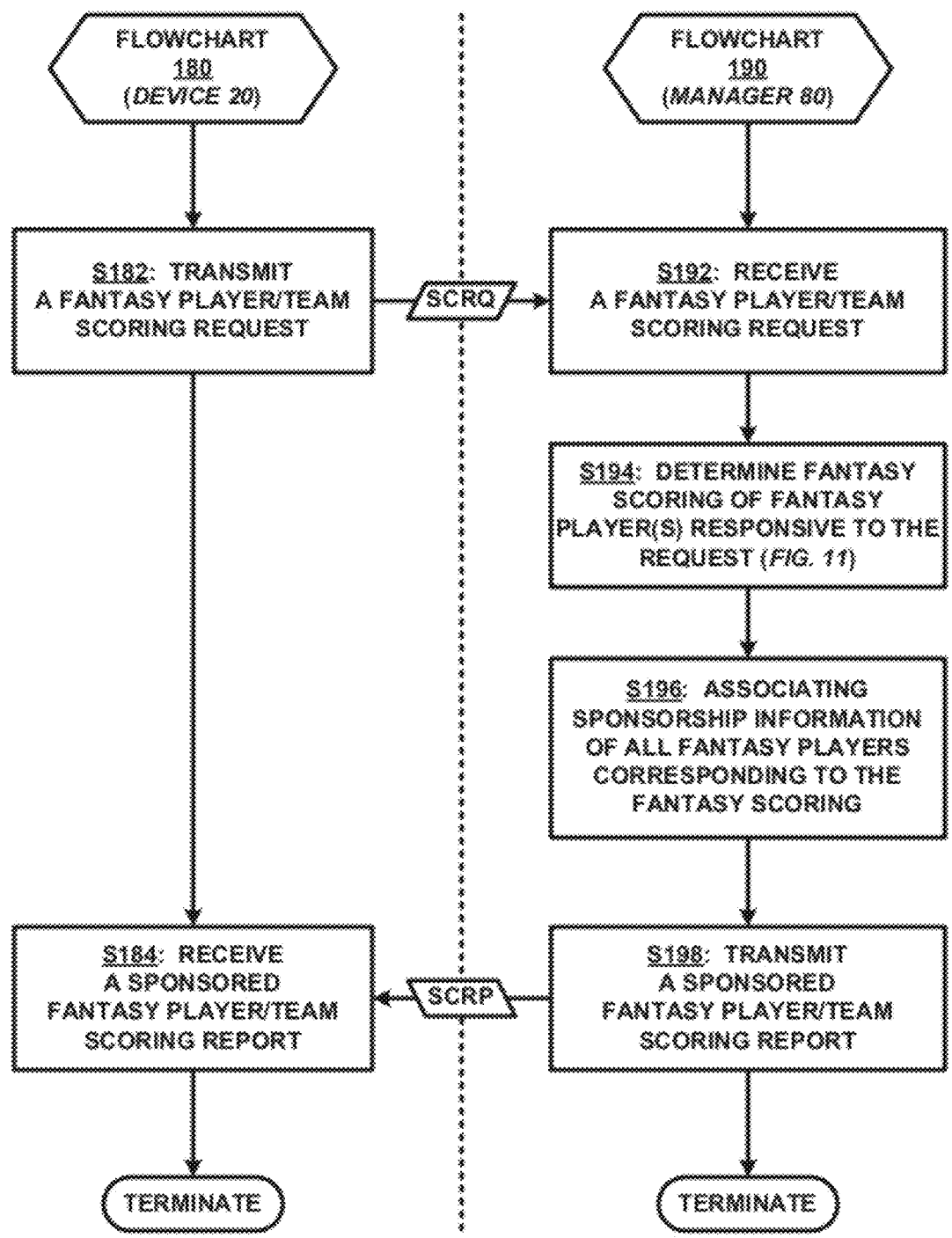
FIG. 10 illustrates a fourth embodiment of a flowchart representative of a fantasy client request method in accordance with the present invention.
Figure 11:
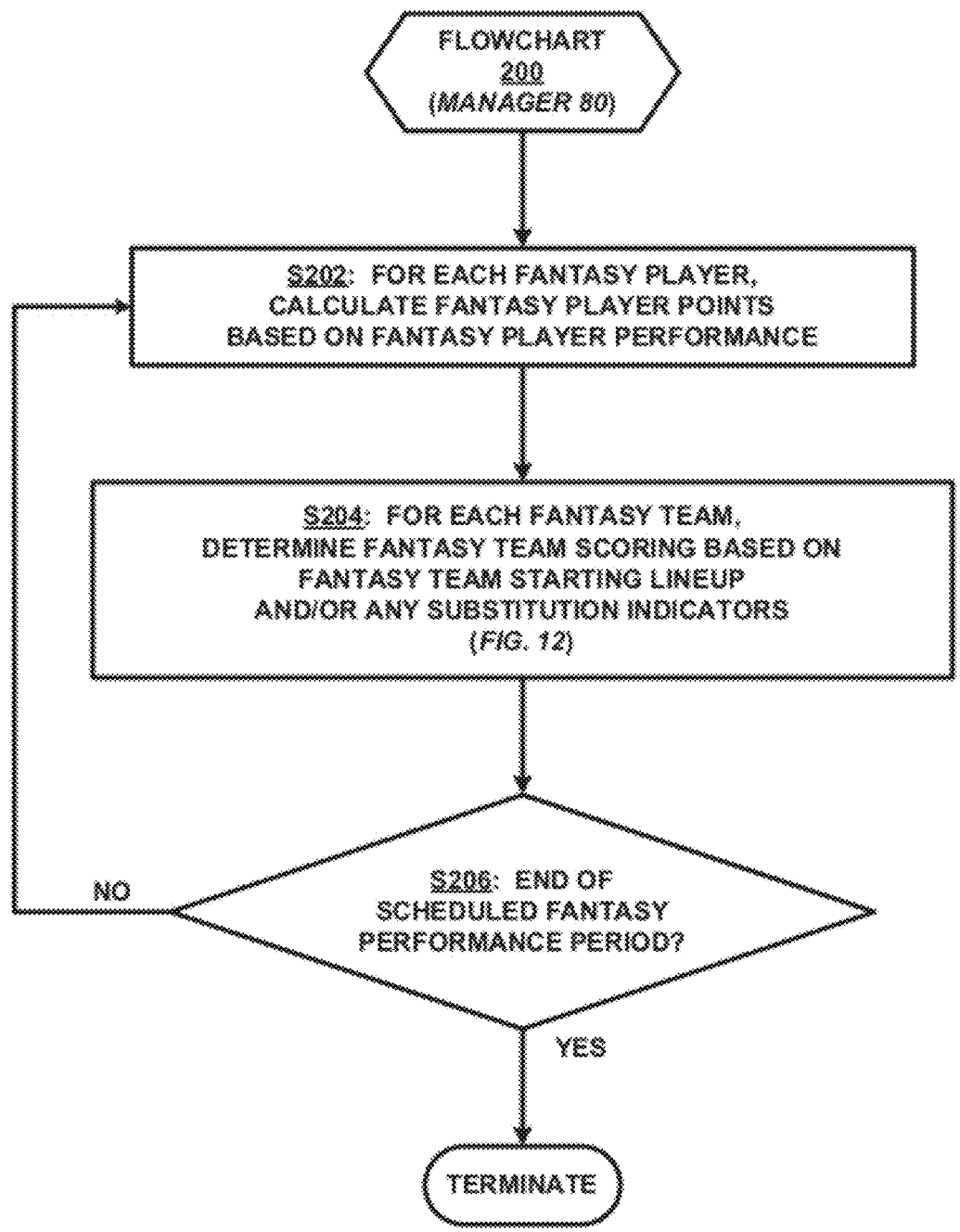
FIG. 11 illustrates one embodiment of a flowchart representative of a fantasy scoring method in accordance with the present invention.

FIG. 10 depicts a fantasy client request in the form of a fantasy player/team scoring request. Specifically, a stage S182 of a flowchart 180 and a stage S192 of a flowchart 190 encompasses a fantasy client device 20 and fantasy gameplay manager 80 exchanging a fantasy scoring request SCRQ involving an individual fantasy player or a team of fantasy players. A stage S194 of flowchart 190 encompasses fantasy gameplay manager 80 determining a fantasy scoring of each fantasy player responsive to the request.

In one embodiment, a stage S202 of a flowchart 200 encompasses fantasy gameplay manager 80 calculating fantasy player points in accordance with a league scoring policy based on fantasy player performance in real-time in relation to a schedule fantasy performance period. A stage S204 of flowchart 200 encompasses fantasy gameplay manager 80 determining fantasy team scoring based on a fantasy team starting lineup and any substitution indicators. Stages S202 and S204 are continually updated until such time the scheduled fantasy performance period has ended.

Figure 12:
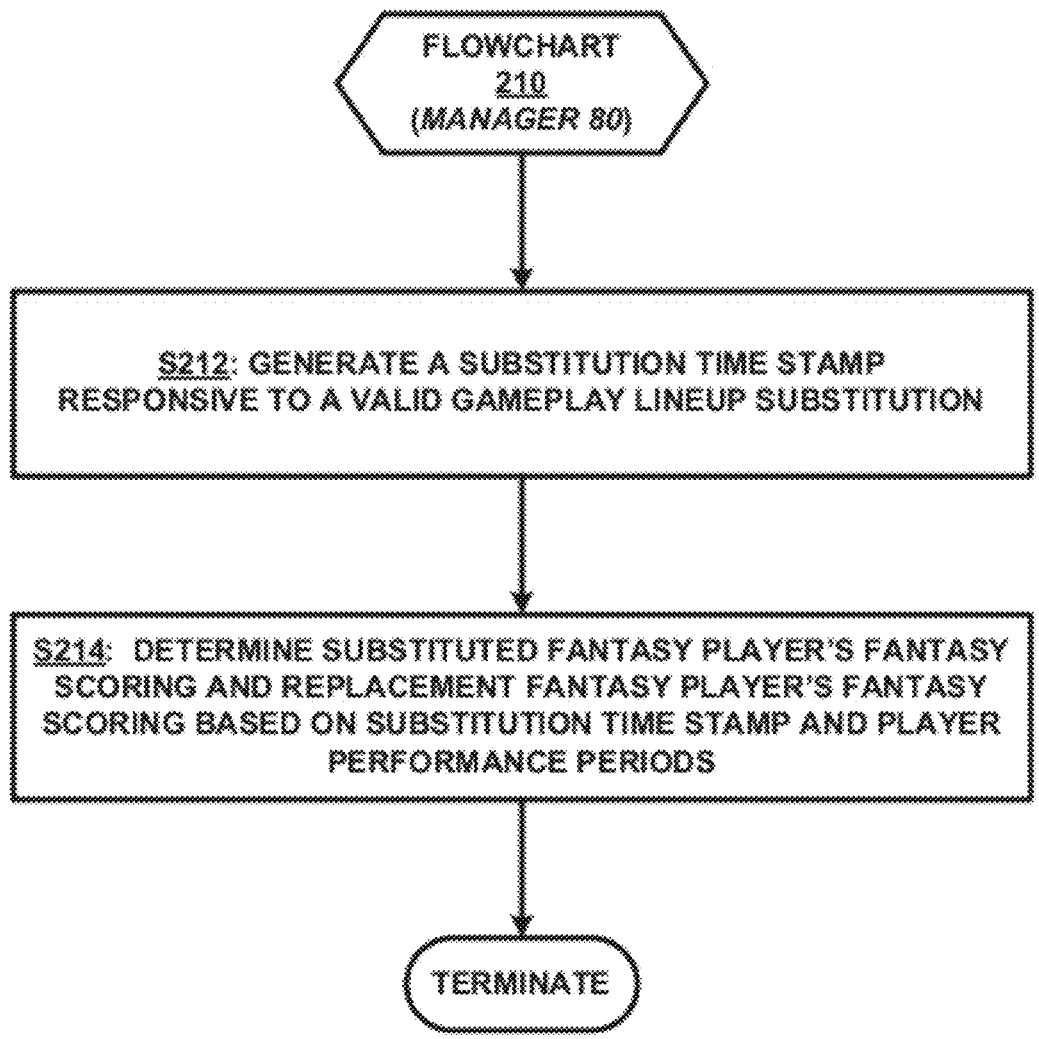
FIG. 12 illustrates a third embodiment of a flowchart representative of a fantasy substitution method in accordance with the present invention.

For purposes of the present invention, the term "substitution indicator" is broadly defined herein as an indication of one fantasy player being substituted in fantasy team lineup by another fantasy player. In one embodiment, as shown in FIG. 12, the substitution indicator is generated by fantasy gameplay manager 80 as a substitution time stamp during a stage S212 of a flowchart 210 in response to a valid gameplay lineup substitution having one fantasy player designated as a substituted fantasy player and another fantasy player designated as the replacement fantasy player. The substitution time stamp can be on based on Greenwich Mean Time ("GMT") or a time related to one or more player performance periods.

A stage S214 of flowchart 210 encompasses fantasy gameplay manager 80 determining a substitute fantasy player's fantasy scoring and a replacement fantasy player's fantasy scoring based on the substitution time stamp and the player's performance periods. For example, if a fantasy client device 20 transacts a replacement of Peyton Manning for Tom Brady at the end of the first quarter of Manning's game as indicated by the substitution time stamp and Brady completed his game, then Manning's scoring will be based on his only quarter of game and Tom Brady's scoring will be based on the $2^{nd}$, $3^{rd}$ and $4^{th}$ quarters of Brady's game. Also by example, if a fantasy client transacts a replacement of Roger Clemens for Randy Johnson at the end of the $1^{st}$ and $2^{nd}$ innings pitched by Clemens as indicated by the substitution time stamp and Johnson completed his game, then Clemens' scoring will be based on his pitched $1^{st}$ and $2^{nd}$ innings and Randy Johnson's scoring will be based on his pitched $3^{rd}$-$9^{th}$ innings. From these two examples, those having ordinary skill in the art will appreciate the many benefits and various simple to complex implementations of the substitution time stamp in accordance with the present invention.

Referring again to FIG. 10, a stage S196 of flowchart 190 encompasses fantasy gameplay manager 80 associates relevant portions of sponsorship information of the subject fantasy players(s) to the relevant portions fantasy player information of the subject fantasy player(s) as previously described herein, particularly in view of sponsorship selection criteria. A stage S184 of flowchart 180 and a stage S198 of flowchart 190 encompasses the intended fantasy client device 20 and fantasy gameplay manager 80 exchanging a fantasy player/team scoring report SCRP.

Figure 13:
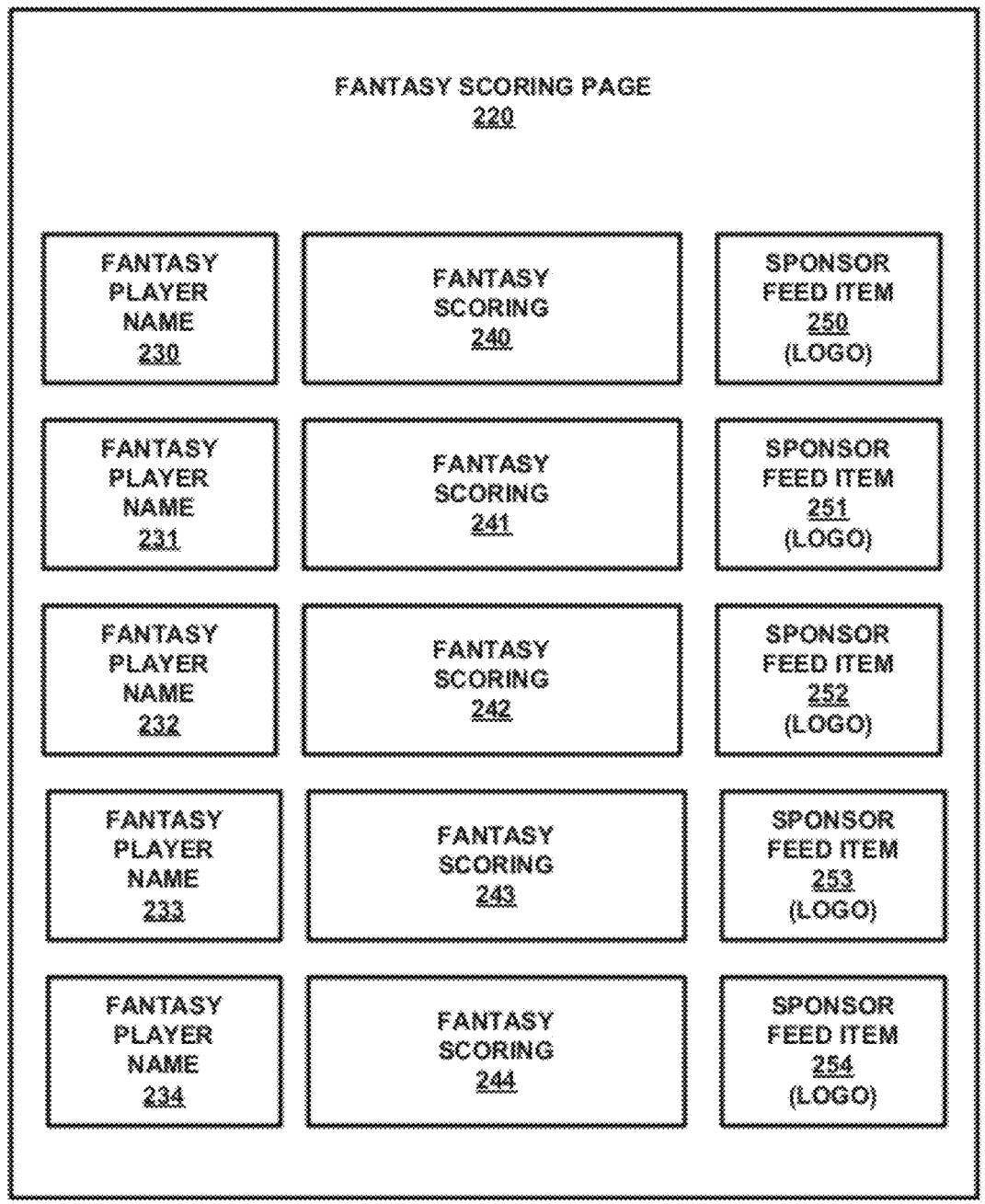
FIG. 13 illustrates a third embodiment of a web page in accordance with the present invention.

FIG. 13 illustrates an exemplary fantasy player/team scoring report SCRP in the form of a webpage 220. As shown, five (5) fantasy players 230-234 with the respective fantasy scoring 240-244 and sponsor logo feed item 250-254 are displayed.

Figure 14:
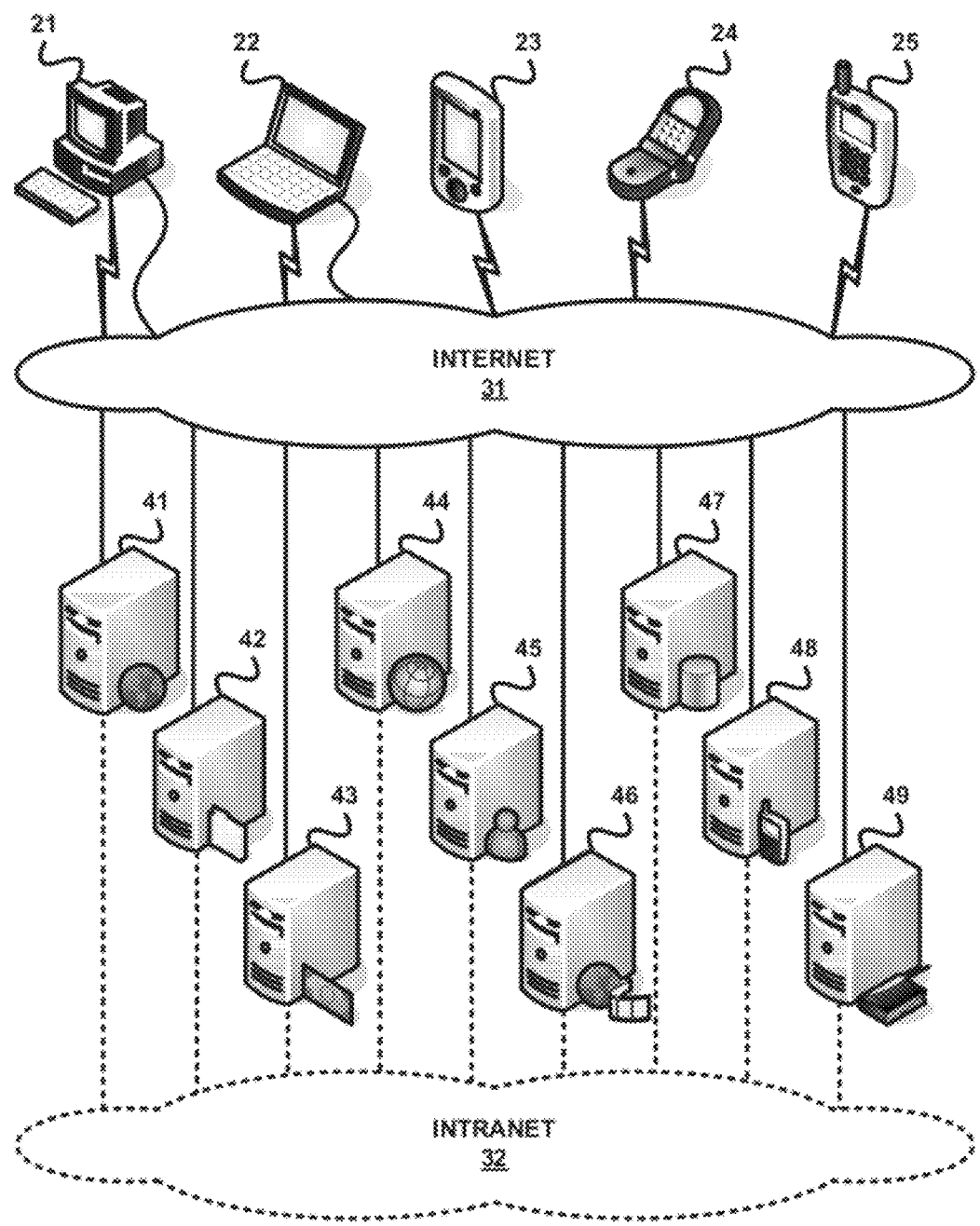
FIG. 14 illustrates exemplary embodiments of fantasy client devices and a fantasy server system in accordance with the present invention.

Referring to FIG. 1, the present invention does not impose any limitations or restrictions to the structural configurations of fantasy client devices 20, network system 30 and fantasy server system 40. FIG. 14 illustrates an example implementation of the network based environment illustrated in FIG. 1. Specifically, five (5) fantasy client devices in the form of a personal computer 21, a laptop 22, a personal data assistant 23, a mobile phone 24 and a smart phone 25 are structurally configured as known in the art to access via an Internet 31 an exemplary array of servers in the form a web server 41, a file server 42, an e-commerce server 43, a content management server 44, a real-time communication server 45, a streaming media server 46, a database server 47, a mobile information server 48 and a directory server 49, which are optionally linked via an Intranet 32. In practice, fantasy player information and sponsorship information are managed by this array of servers 41-49, and fantasy content manager 70 and fantasy gameplay manager 80 are embodied as software and/or firmware installed/distributed within one or more of the servers 41-49 whereby the processors of servers 41-49 can execute instructions of the software and/or firmware to implement the various inventive principles of the present invention.

Those having ordinary skill in the art will appreciate that the array of servers 41-49 can physically exist as separate hardware platforms or logically exist on a minimum number of hardware platforms. Those having ordinary skill in the art will appreciate that some of the servers 41-49 can be eliminated and/or other types of servers can be added to this array. In one embodiment, web server 41 can individually execute the instructions of fantasy content manager 70 and fantasy gameplay manager 80 while fantasy player information and/or sponsorship information can be managed by file server 42, content management server 44, stream media server 46, and/or database server 47.

Referring to FIGS. 1-14, the present invention does not impose any limitations or any restrictions to the form of fantasy client requests whereby any fantasy client request can invoke action by fantasy content manager 70 and/or fantasy gameplay manager 80. In practice, a fantasy client request can take the form of one of the fantasy client requests described herein, a combination of two or more of the fantasy client requests described herein, or any other form not described herein as would be appreciated by those having ordinary skill in the art.

Furthermore, in some cases, sponsorship information may be not designated to one or more of the fantasy players. During these cases, all requests are executed as taught herein and under the inventive principles of the present invention exclusive of any association of sponsorship information to fantasy player information.

An alert window can be displayed with fantasy point updates on players. The feed item associated with the alert can be accessed to see a streamed video clip of the play. Alerts can also be given to other player performance that are not being played or those on waivers or not drafted. In a real time substitution version of fantasy sports, for example football, the user can determine if it would be beneficial to replace a player that is injured or not performing well. In another window game information, including game score, time remaining, line up, having involved fantasy players can be displayed for both the users fantasy team and the users opponents fantasy team. The user can then have a continuous update of each game.

A user can view all carries by your running back—all routes by your receiver—encourage more involvement and more sponsorship. Real time point counts on all players and ability to sub in and out during a game—time periods tracked by system. Ability to see what substitutions your opponent has made and you can counter with a move—you are ahead and your opponent subs in a quarterback—if you have the receiver that quarterback throws to—you can sub in to lessen the potential impact.

One type of information that may be displayed in the single item window is information related to fantasy sports. For example, a user may receive updates on the statistics of players they have specified, player injuries, players not currently held in their league that are having impressive statistics, scouting reports for weekly matchups, or the like.

A user may select that all Fantasy Football players on his team and/or opponents team with yardage, touchdowns and Fantasy points be displayed every 5 minutes or scrolled through while the user is watching TV or as a message to the users portable communication device on Sundays. Friends' messages related to the football or other game can be prioritized for display when the user is watching TV on game day.

In one embodiment, a fantasy sports feed can be continuously adjusted based on user selected or IAP suggested or provided factors, for example, for fantasy football some factors may include: player versus defense strength, player versus opponent time of possession, player's historical performance against opponent team, players performance at stadium, weather conditions, opponents players, player's recent performance, injury reports, etc. The user may select factors for the player selection feed, which then based on the factors selects the best team from the users fantasy team and all other available players. For example, during a football season Sunday, a fantasy player may be injured; the feed will provide a replacement player based on the selected or provided factors. The feed may make the selection for the user or alert the user with a feed item alert.

Those having ordinary skill in the art will further appreciate various objects and advantages of the present invention, such as, for example, a realization of a comprehensive sponsorship of fantasy players on an individual basis and/or a team basis with an improved exchange of fantasy content between fantasy client devices 20 and fantasy server system 40.

While the embodiments of the invention disclosed herein are presently considered to be preferred, various changes and modifications can be made without departing from the spirit and scope of the present invention. The scope of the invention is indicated in the appended claims, and all changes that come within the meaning and range of equivalents are intended to be embraced therein.

We claim:

1. A computer-implemented method for operating a fantasy league using at least one fantasy server system, the method comprising:
   providing fantasy player information including performance history of one or more real-world athletes selected as fantasy players;
   updating the fantasy player information in real-time based on fantasy player performance information from a real-world performance;
   providing at least one substitution factor;
   receiving a real-time injury information; and
   determining a real-time fantasy player substitution at the fantasy server system based on the real-time injury information and the at least one substitution factor.

2. The computer-implemented method of claim 1, wherein the at least one substitution factor is received from a fantasy client.

3. The computer-implemented method of claim 1, wherein the at least one substitution factor includes a player's historical performance against an opponent team.

4. The computer-implemented method of claim 1, wherein the at least one substitution factor includes weather conditions.

5. The computer-implemented method of claim 1, wherein the at least one substitution factor includes a fantasy player's recent performance.

6. The computer-implemented method of claim 1, wherein the at least one substitution factor includes a fantasy opponent's real-time performance.

7. The computer-implemented method of claim 1, further comprising providing information to a fantasy client including a real-time fantasy player substitution alert.

8. The computer-implemented method of claim 7, further comprising receiving a substitution indicator from the fantasy client, wherein the real-time fantasy player substitution is based on the substitution indicator.

9. The computer-implemented method of claim 1, further comprising providing a fantasy player substitution update to a fantasy opponent.

10. A computer-implemented method for operating a fantasy league using at least one fantasy server system, the method comprising:
    providing fantasy player information including performance history of one or more real-world athletes selected as fantasy players;

updating the fantasy player information in real-time based on fantasy player performance information from a real-world performance;
providing at least one fantasy player associated with a fantasy client;
receiving information about the at least one fantasy player;
sending a real-time injury alert to the fantasy client, the real-time injury alert relating to the at least one fantasy player; and
receiving a real-time substitution indicator at the fantasy server system including a designated replacement fantasy player based on the real-time injury alert.

11. The computer-implemented method of claim 10, wherein the real-time substitution indicator is received from the fantasy client.

12. The computer-implemented method of claim 10, further comprising determining whether the real-time substitution indicator indicates a substitution that is in compliance with a fantasy league transaction policy.

13. The computer-implemented method of claim 12, further comprising sending a confirmation or rejection message based on the determination of whether the substitution is in compliance with the fantasy league transaction policy.

14. The computer-implemented method of claim 10, further comprising sending available player information to the fantasy client.

15. The computer-implemented method of claim 10, further comprising sending real-time fantasy player performance information regarding players available for substitution.

16. The computer-implemented method of claim 10, wherein the real-time injury alert contains an audio or video clip.

17. The computer-implemented method of claim 10, wherein the designated replacement fantasy player is selected based on a lineup received prior to the real-time injury alert.

18. A computer-implemented method for operating a fantasy league using at least one fantasy server system, the method comprising:
providing fantasy player information regarding performance history of one or more real-world athletes selected as fantasy players;
updating the fantasy player information in real-time based on fantasy player performance information from a real-world performance;
providing at least one substitution factor;
receiving a real-time injury report;
sending a fantasy player substitution alert to a fantasy client based on the substitution factors and the real-time injury report; and
receiving a real-time substitution indicator input from a fantasy client, wherein real-time substitution indicator input is a gameplay lineup substitution request designating one fantasy player as a substituted fantasy player and another fantasy player as a replacement fantasy player, wherein the gameplay lineup substitution is transacted at the fantasy server system during a real-time performance of the substituted fantasy player.

19. The computer-implemented method of claim 18, further comprising:
associating a substitution time stamp with the gameplay lineup substitution request;
determining fantasy scoring for the substituted fantasy player based on the substitution time stamp of the substituted fantasy player; and
determining fantasy scoring for the replacement fantasy player based on the substitution time stamp of the replacement fantasy player.

20. The computer-implemented method of claim 19, wherein determining the fantasy scoring is based on a player performance period associated with the substitution time stamp.

* * * * *